US008872849B2

(12) United States Patent
Zhao et al.

(10) Patent No.: US 8,872,849 B2
(45) Date of Patent: Oct. 28, 2014

(54) RELATIONAL RENDERING OF MULTI-FACETED DATA

(75) Inventors: Jian Zhao, Ontario (CA); Steven M. Drucker, Bellevue, WA (US); Danyel Fisher, Jr., Seattle, WA (US); Donald Brinkman, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 226 days.

(21) Appl. No.: 13/359,508

(22) Filed: Jan. 27, 2012

(65) Prior Publication Data

US 2013/0194294 A1 Aug. 1, 2013

(51) Int. Cl.
*G09G 5/00* (2006.01)
*G06T 11/20* (2006.01)

(52) U.S. Cl.
USPC .......................................... 345/629; 345/440

(58) Field of Classification Search
CPC .............. G06F 17/30017; G06F 17/30289; G06F 17/30306; G06F 17/30716; G06F 17/30; G06F 17/30864; G06F 17/30867; G06F 17/30873; G06F 17/30286; G06F 17/30705; G06F 3/0481; G06F 3/04815; G06F 17/30011; G06F 17/30389; G06F 17/30398; G06F 17/30572; G06F 17/30696; G06F 17/30731; G06F 17/30914; G06F 17/246; G06T 11/206; G06T 11/20; H04L 41/22
USPC .................. 345/440; 707/3, 102; 715/841
See application file for complete search history.

(56) References Cited

U.S. PATENT DOCUMENTS

| 5,717,879 | A | 2/1998 | Moran et al. |
| 7,577,651 | B2 | 8/2009 | Jones et al. |
| 2006/0197762 | A1 | 9/2006 | Smith et al. |
| 2007/0033632 | A1 | 2/2007 | Baynger et al. |
| 2009/0222412 | A1* | 9/2009 | Lee et al. .......................... 707/3 |
| 2009/0322756 | A1* | 12/2009 | Robertson et al. ............. 345/440 |
| 2013/0106682 | A1* | 5/2013 | Davis et al. .................. 345/156 |

OTHER PUBLICATIONS

Wang, et al., "Exploratory Search Over Temporal Event Sequences: Novel Requirements, Operations, and a Process Model", Retrieved at <<http://hcil.cs.umd.edu/trs/2009-35/2009-35.pdf>>, Retrieved Date: Oct. 11, 2011, pp. 4.
Fails, et al., "A Visual Interface for Multivariate Temporal Data: Finding Patterns of Events across Multiple Histories", Retrieved at <<http://hcil.cs.umd.edu/trs/2005-25/2005-25.pdf>>, IEEE Symposium on Visual Analytics and Technology, Oct.-Nov. 31-02, 2006, pp. 167-174.

(Continued)

*Primary Examiner* — Kee M Tung
*Assistant Examiner* — Nicole Gillespie
(74) *Attorney, Agent, or Firm* — Sandy Swain; Judy Yee; Micky Minhas

(57) ABSTRACT

Technology for rendering representations of multi-faceted data are disclosed. As one example, the technology includes organizing and rendering multiple subsets of a dataset according to temporal or other linear attributes, e.g., for visual comparison and/or other visualization. A collection of subsets may be determined in response to a selection of a facet having multiple facet attributes. Each subset may include the entries of the dataset that have the facet attribute corresponding to that subset. Optionally, the multiple subsets may be rendered in alignment with corresponding portions of a hierarchical depiction, e.g., to visually represent the parameters of the subsets.

20 Claims, 11 Drawing Sheets

(56) References Cited

OTHER PUBLICATIONS

Hildebrand, et al., "Facet: A Browser for Heterogeneous Semantic Web Repositories", Retrieved at <<http://oai.cwi.nl/oai/asset/11421/11421A.pdf>>, 5th International Semantic Web Conference (ISWC), Jun. 2006, pp. 272-285.

Palm, Fredrik, "Abstracting query building for multi-entity faceted browsing", Retrieved at <<http://qviz2.humlab.umu.se/frepalm/dighis/images/f/fb/Abstracting_query_building_for_multi.pdf>>, FQAS: Proceedings of the 8th International Conference on Flexible Query Answering Systems Berlin, Heidelberg: Springer-Verlag, 2009, pp. 1-12.

Blok, et al., "Web-based visual exploration and error detection in large data sets: antarctic iceberg tracking Data as a case", Retrieved at <<http://icaci.org/documents/ICC_proceedings/ICC2009/html/nonref/20_15.pdf>>, Oct. 11-16, 2009, pp. 10.

André, et al., "Continuum: Designing Timelines for Hierarchies, Relationships and Scale", Retrieved at <<http://eprints.ecs.soton.ac.uk/13818/1/continuum-rev.pdf>>, In Proceeding of the 20th annual ACM symposium on User interface software and technology (UIST), 2007, pp. 101-110.

Furnas, et al., "Generalized Fisheye Views", Retrieved at <<http://furnas.people.si.umich.edu/Papers/FisheyeCHI86.pdf>>, In Proceeding of the SIGCHI Conference on Human factors in computing systems (CHI), 1986, pp. 16-23.

Lee, et al., "FacetLens: Exposing Trends and Relationships to Support Sensemaking within Faceted Datasets", Retrieved at <<http://research.microsoft.com/en-us/um/redmond/groups/cue/publications/CHI2009-FacetLens.pdf>>, In Proceeding of the 27th international Conference on Human factors in computing systems (CHI), 2009, pp. 1293-1302.

Phan, et al., "Progressive Multiples for Communication-minded Visualization", Retrieved at <<http://www.purdue.edu/discoverypark/vaccine/assets/pdfs/publications/pdf/Progresive%20Multiples.pdf>>, In Proceeding of Graphics Interface (GI), 2007, pp. 225-232.

Plaisant, et al., "LifeLines: Visualizing Personal Histories", Retrieved at <<http://www.ifs.tuwien.ac.at/~mlanzenberger/ps_infovis/ss03/stuff/auth/plaisant.pdf>>, In Proceeding of the SIGCHI Conference on Human factors in computing systems (CHI), Apr. 13-18, 1996, pp. 9.

Smith, et al., "FacetMap: A Scalable Search and Browse Visualization", Retrieved at <<http://www.cc.gatech.edu/~john.stasko/8001/smith06.pdf>>, IEEE Transactions on Visualization and Computer Graphics, vol. 12, No. 5, Sep.-Oct. 2006, pp. 797-804.

Wongsuphasawat, et al., "LifeFlow: Visualizing an Overview of Event Sequences", Retrieved at <<http://hcil.cs.umd.edu/trs/2010-22/2010-22.pdf>>, In Proceeding of the SIGCHI Conference on Human factors in computing systems (CHI), May 7-12, 2011, pp. 1-10.

Zhao, et al., "KronoMiner: Using Multi-foci Navigation for the Visual Exploration of Time-series Data", Retrieved at <<http://www.cs.toronto.edu/~jianzhao/papers/kronominer.pdf>>, In Proceeding of the SIGCHI Conference on Human factors in computing systems (CHI), May 7-12, 2011, pp. 1737-1746.

* cited by examiner

RELATIONAL RENDERING OF MULTI-FACETED DATA

BACKGROUND

The rapid proliferation of computing technology and computing devices has resulted in ever-increasing amounts of electronically accessible data. In many cases, such data is organized into databases or other datasets. In some cases, these datasets include vast numbers of entries, which may complicate efforts to search, explore, or otherwise interact with the dataset. Accordingly, various information retrieval technologies have been developed to improve user interaction with these datasets. One such technology is faceted search technology.

Faceted search technology provides a unique way of interacting with a dataset. As one example, a faceted search may be used to locate entries of a dataset that share specific characteristics, aspects, features, or other attributes. For example, a faceted search may exclude or otherwise filter out entries that are not associated with each of one or more target attributes. As a specific example, faceted searching may be employed to search an inventory database by price range, manufacturer, and/or specific specifications. Likewise, faceted searching may be employed to search an electronic library catalog by subject matter, keyword, publisher, and/or author.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technology relating to rendering representations of multi-faceted data is described. The technology includes a faceted browsing interface that may be used to concurrently view visual representations of multiple subsets of a dataset. The visual representations may be organized according to one or more linear attributes of the entries of the respective subsets. The entries of each individual subset may all share one facet attribute from each selected facet. Further, additional visual representations may be rendered if multiple facets are selected. In one such example, visual representations are rendered for combinations of facet attributes spanning multiple selected facets.

Depictions of selected facets and the facet attributes thereof may also be rendered as a hierarchical depiction into a hierarchical depiction area, and the visual representations may be rendered into a dataset display area. In this example, visual representations may be aligned or otherwise correlated (e.g., through spatial alignment or other visual or conceptual techniques) to corresponding portions of the hierarchal depiction, e.g., as an indication of the facet attributes associated with each visual representation. Additionally, the dataset display area may be dynamically updated based on operations performed on the hierarchal depiction.

Other aspects will be appreciated upon reading and understanding the attached figures and description.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale.

For a better understanding of the present invention, reference will be made to the following Detailed Description, which is to be read in association with the accompanying drawings, wherein.

DETAILED DESCRIPTION

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of embodiments of the technology. It is intended that the terminology used in this disclosure be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section. For example, the term "based on" or "based upon" is not exclusive and is equivalent to the term "based, at least in part, on" and includes being based on additional factors, some of which are not described herein. References in the singular are made merely for clarity of reading and include plural references unless plural references are specifically excluded. The term "or" is an inclusive "or" operator and is equivalent to the term "and/or" unless specifically indicated otherwise. As used herein, the terms "component" and "system" are intended to encompass hardware, software, or various combinations of hardware and software. Thus, for example, a system or component may be a process, a process executing on a computing device, the computing device, or a portion thereof.

Introduction

Generally, the described technology relates to graphical user interface (GUI) technology that may enable efficient interaction with datasets. As one example, the technology enables users to quickly generate visual representations for multiple combinations of facet attributes that are spread across multiple facets, e.g., for cross-subset comparison, exploration, or other visualization. The disclosed technology may provide dynamic mechanisms for selecting facet metadata elements and thus alleviate burdens associated with individually specifying facet attributes for each of multiple visual representations. In addition, dynamic updating of a dataset display area based on operations performed on a hierarchal depiction may enable rapid manipulation of subsets or visual representations while facilitating user cognizance to relationships between the visual representations and the facet attributes associated therewith.

Illustrative Data Constructs

Figure 1:
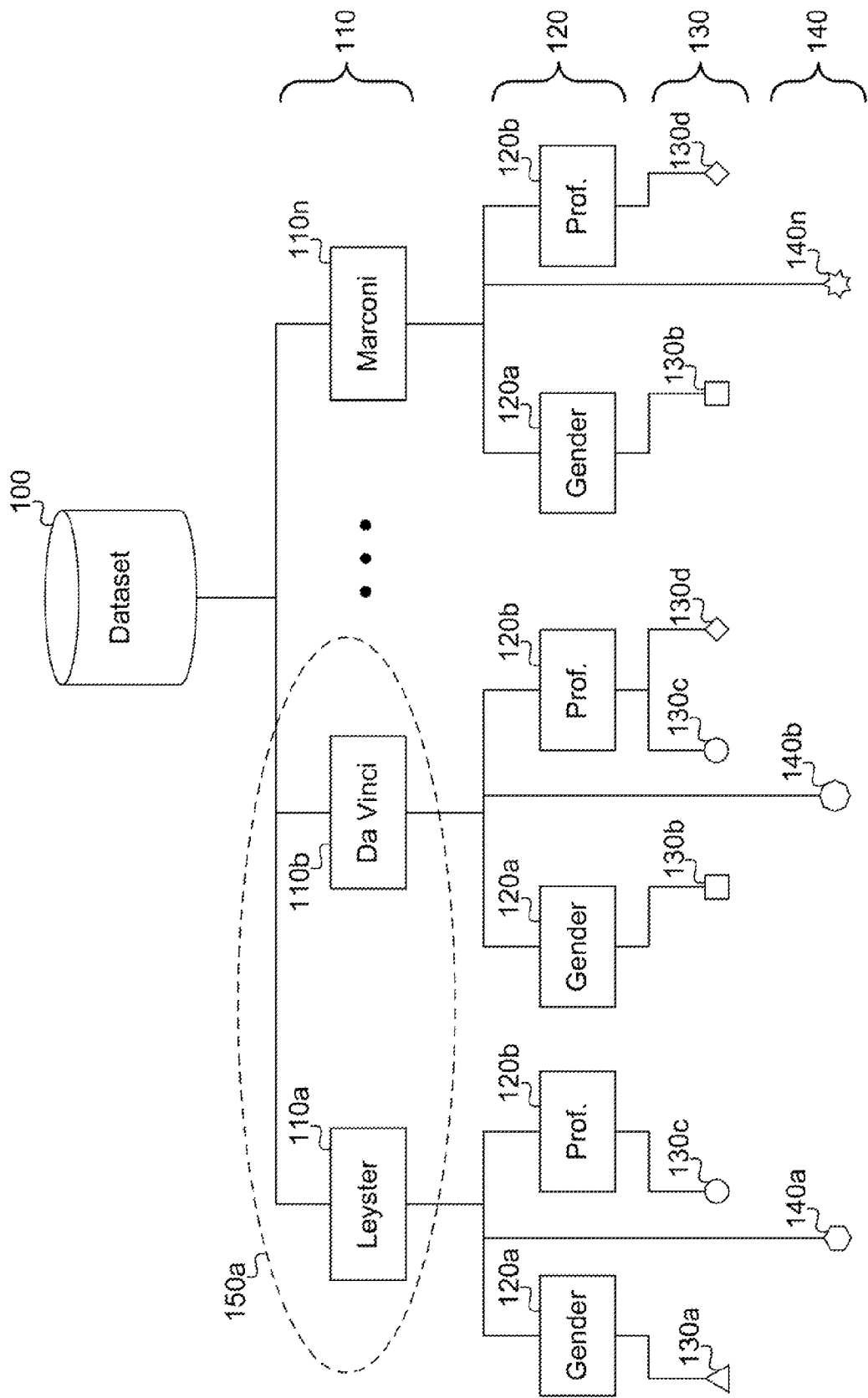
FIG. 1 is a block diagram illustrating relationships between example data constructs described herein.

FIG. 1 illustrates a simplified representation of a dataset 100. Example relationships amongst the various data constructs referred to herein are described in reference to the dataset 100. Although the dataset 100 is described in the context of famous individuals, this specific context is merely provided to facilitate understanding of the broader data construct concepts described herein. Accordingly, other datasets may represent other types of data. Likewise, while not shown in FIG. 1, the dataset 100 includes additional non-illustrated instances of various illustrated constructs and may also include additional types of constructs.

As one example, the dataset 100 may be organized as a database or other collection of data that includes entries 110a-110n (generically or collectively 110). The dataset 100 may also include or be associated with facet or linear metadata that describes entries 110 and/or relationships between entries 110. As used herein, facet metadata includes facets 120a and 120b (generically or collectively 120) and facet attributes 130a-130d (generically or collectively 130). As used herein, linear metadata includes linear attributes 140a-140n (generically or collectively 140). Each of these constructs is described in greater detail below.

As illustrated in FIG. 1, the entries 110 of the dataset 100 represent famous individuals (e.g., Judith Leyster, Leonardo da Vinci, and Guglielmo Marconi), and are associated with metadata regarding the gender and profession of these individuals. For clarity of illustration, the following table summarizes the data and data constructs illustrated in the example of FIG. 1:

TABLE 1

Data and Data Constructs of FIG. 1

| Elements (110) Name | Facets (120) | | Linear Attributes (140) Birth Year |
|---|---|---|---|
| | Gender Facet Attribute (120a) | Profession Facet Attribute (120b) | |
| Judith Leyster (110a) | Female (130a) | Artist (130c) | 1609 (140a) |
| Leonardo da Vinci (110b) | Male (130b) | Artist (130c) Engineer (130d) | 1452 (140b) |
| Guglielmo Marconi (110n) | Male (130b) | Engineer (130d) | 1874 (140n) |

Although FIG. 1 and Table 1 illustrate one example of a dataset 100, the dataset 100 may also include other types of entries 110 and/or be associated with other metadata. For example, the dataset 100 may include additional metadata regarding location, offspring, birth date, or date of death of the represented individuals. As another example, a dataset of scholarly articles may be associated with metadata regarding authorship, publication date, publisher, subject matter, titles, subtitles, or keywords. In still yet another example, a dataset may include a mixture of different types of entries (e.g., famous individuals and scholarly articles). Each entry of a mixed dataset may be associated with metadata appropriate to its specific type.

As used herein, facets 120 represent logical classes of attributes associable to a particular type of entry while facets attributes 130 represent specific attributes for specific entries. Stated another way, a facet is analogous to a variable while a facet attribute is analogous to a particular value of the variable. In the example of FIG. 1, the facets 120a and 120b represent the respective characteristics of gender and profession. The facet attributes of the gender facet 120a are associated with specific genders. Specifically, the facet attribute 130a is associated with a "female" gender while the facet attribute 130b indicates a "male" gender. Likewise, the facet attributes 130c and 130d of the profession facet 120b may include specific professions, such as politician, engineer, scientist, artist, entrepreneur, and author. Here, the facet attribute 130c is the facet attribute for "artist" while the facet attribute 130d indicates a profession of "engineer." The above example use strings that are in one case open-ended and in the other case enumerated. However, this is merely one example of datatypes of a suitable dataset. It is also possible for facets 120 and facet attributes 130 to be numerical values such as integers, floating point numbers, dates, and other enumerated or open-ended datatypes.

Facet attributes of particular facets may be mutually exclusive. For example, gender facet 120a is associated with mutually exclusive "female" and "male" facet attributes 130a and 130b. However, facet attributes of another example facet need not be mutually exclusive. As an illustration, the profession facet 120b of the entry 110b is associated with non-mutually exclusive facet attributes 130c and 130d, e.g., indicating that Leonardo da Vinci was both an artist and an engineer.

Various hierarchal levels of facets 120 and facet attributes 130 may be included within the dataset 100. For example, the artist facet attribute 130c may be a sub-facet having sub-facet attributes of painter, sculptor, and performing artist. The number of levels of sub-facets may also vary, even within one dataset or metadata branch. For example, the painter sub-facet attribute may have sub-facet attributes of renaissance, dadaist, and cubist while the sculptor sub-facet attribute has no further sub-facet attributes. In addition, groupings of sub-facets may be native to the dataset 100 or may be dynamically generated through user interaction or an automated process. Such dynamically generated groupings may alter the structure of the data in the dataset 100 or may leave the structure unchanged.

In addition, the dataset 100 may also include or be associated with linear metadata, such as linear attributes 140. These linear attributes 140 may define a sequence for the entries 110 or describe positions of the entries 110 with respect to an axis. For example, linear attributes 140 may include temporal attributes (e.g., dates, times, or durations), geographical attributes (e.g., specific latitudes, longitudes, time zones, or positions along a route), sequence numbers, prices, or other suitable values. Additionally, entries 110 may be sequenced by the linear attributes 140 or be organized in reference to the defined axis by the linear attributes 140. For example, entries having linear attributes representing dollar values could be sorted by cost. As another example, entries having temporal attributes could be organized along a timeline.

The entries 110 of the dataset 100 may also be thought of as being members of one or more subsets, such as subset 150a (generically or for plural reference 150). As used herein, a subset 150 is a logical construct for collectively representing the set of entries 110 that mutually share one or more facet attributes 130 and/or are mutually associated with one or more facet attribute groups. In the illustration of FIG. 1, the subset 150a is a subset of entries 110 that share the artist facet attribute 130c. In this example, entries 110a and 110b are members of the subset 150a because they each have the artist facet attribute 130c. However, entry 110n is not a member of the subset 150a because it does not have the artist facet attribute 130c.

Any quantity of facet attributes 130 may also be related to each other by facet attribute combinations or facet attribute groups. For example, and as used herein, a facet attribute combination represents a subset 150 having multiple shared facet attributes. A facet attribute combination subset includes the entries 110 associated with each of the constituent facet attributes 130 of the facet attribute combination. For example, an engineer-male facet attribute combination subset includes the entries 110 of the dataset 100 that have both the male facet attribute 130b and the engineer facet attribute 130d. Entries 110b and 110n are thus members of the engineer-male subset. In contrast, and as used herein, a facet attribute group is a representation of a union of the subsets 150 of each of the constituent facet attributes 130. For example, an artist+engineer facet attribute group associated with the artist facet attribute 130c and engineer facet attribute 130d includes the entries 110 of the dataset 100 that have either the artist facet attribute 130a or the engineer facet attribute 130d. Entries 110a, 110b and 110n are thus members of the artist+engineer group.

For brevity and ease of reading, certain relationships between various data constructs are described herein using common parlance terms typically associated with possessor/possessed relationships. For example, a facet attribute 130 may be referred to as belonging to a facet 120 or entry 110 (e.g., "a facet attribute 130a of the facet 120a") or an entry 110 may be referred to as possessing a facet 120 or facet attribute 130 (e.g., "the entry 110a has a facet attribute 130a"). Similarly, a facet 120 may be referred to as possessing a facet attribute 130 or a subset 150 may be referred to as possessing or being possessed by another data construct.

These simplified descriptions are to be understood as encompassing other relationships between the referenced data constructs and/or representations thereof. Stated another way, any description herein of a relationship as a possessor or possessed relationship is equivalent to description of the referenced items as being related in the manner most appropriate for the referenced data constructs and/or representations thereof. For example, it is to be understood that "the entry has a facet" is equivalent to "the entry is associated to a facet" or "a facet is associated with the entry." As another example, the phrase "the visual representation of the facet attribute" also means "the visual representation of the subset of entries of the dataset that are associated with the facet attribute."

The various data constructs of the dataset 100 may be embodied in a variety of ways. For example, the dataset 100 or the entries 110 may be stored as non-transitory data (e.g., in volatile memory, semi-volatile memory, or non-volatile memory) in any suitable format or may be received from another device via a data signal (e.g., over the Internet, from an intranet database server system, or from any other suitable source). In addition, the metadata of FIG. 1 may be embodied within the dataset 100, may be separate from the dataset 100, or be split between the dataset 100 and another structure (e.g., the linear attributes 140 are stored in the dataset 100 while the facets 120 and the facet attributes 130 are stored in another structure).

Illustrative Graphical User Interfaces

Various illustrative displays of example GUIs are now described with reference to FIGS. 2-9. It is noted that these displays and GUIs are provided as non-limiting examples of the technology. Accordingly, other suitable displays and GUIs are possible. For example, other displays or GUIs may omit certain illustrated features, include additional features, or have alternate layouts.

FIGS. 2-7 are representations of displays 200-700 that may be presented on a visual display device as a user interacts with the dataset 100 through a first example GUI. While the illustrated displays are described as the output of a specific sequence of interactions, other displays are possible. In addition, other sequences of interactions may result in other displays.

Figure 2:
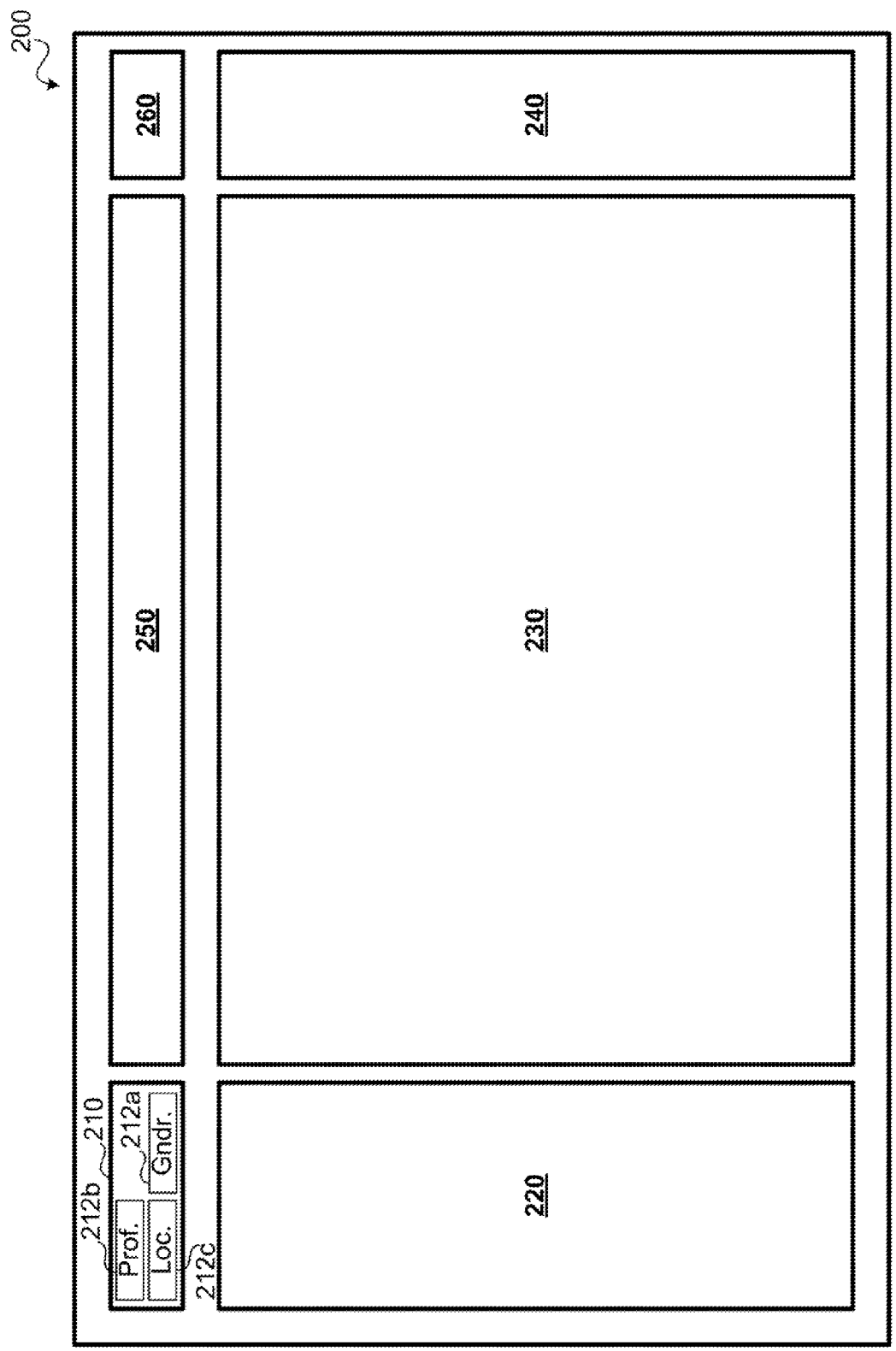
FIGS. 2-9 are representations of displays from example graphical user interfaces.

FIG. 2 is a representation of a display 200 of the first example GUI. As shown, the display 200 includes a facet selection area 210, a hierarchical depiction area 220, a dataset display area 230, a vertical reference area 240, a horizontal reference area 250, and a control area 260. The display 200 may be presented before any facets 120 have been selected. In this example, the display 200 provides selectable facet icons 212a-212c (generically or collectively 212) for user selection.

As a brief introduction to this GUI, the facet selection area 210 provides a location for viewing selectable facet icons 212 of facets 120, e.g., to enable selection of facets 120. As shown, the facet selection area 210 displays the gender facet icon 212a, the profession facet icon 212b, and the location facet icon 212c. A facet icon 212 may be selected from the facet selection area 210 by way of any suitable action. For example, a facet icon 212 may be selected by clicking or tapping on the facet icon 212, by dragging the facet icon 212 into the hierarchical depiction area 220, or by dragging the facet icon 212 out of the hierarchical depiction area 220. In this example, the facet selection area 210 is configured to display the facet icons 212 until selected, e.g., the facet icons 212 are removed from the facet selection area 210 after they have been selected. However, in other examples, a facet icon 212 may remain in the facet selection area 210 despite its prior selection. In these other examples, visual features (e.g., colors, fonts, outlines, or icons) may be provided as an indication that the facet icon 212 was previously selected.

The hierarchical depiction area 220, dataset display area 230, vertical reference area 240, horizontal reference area 250, and control area 260 are described below in conjunction with FIG. 3.

Figure 3:
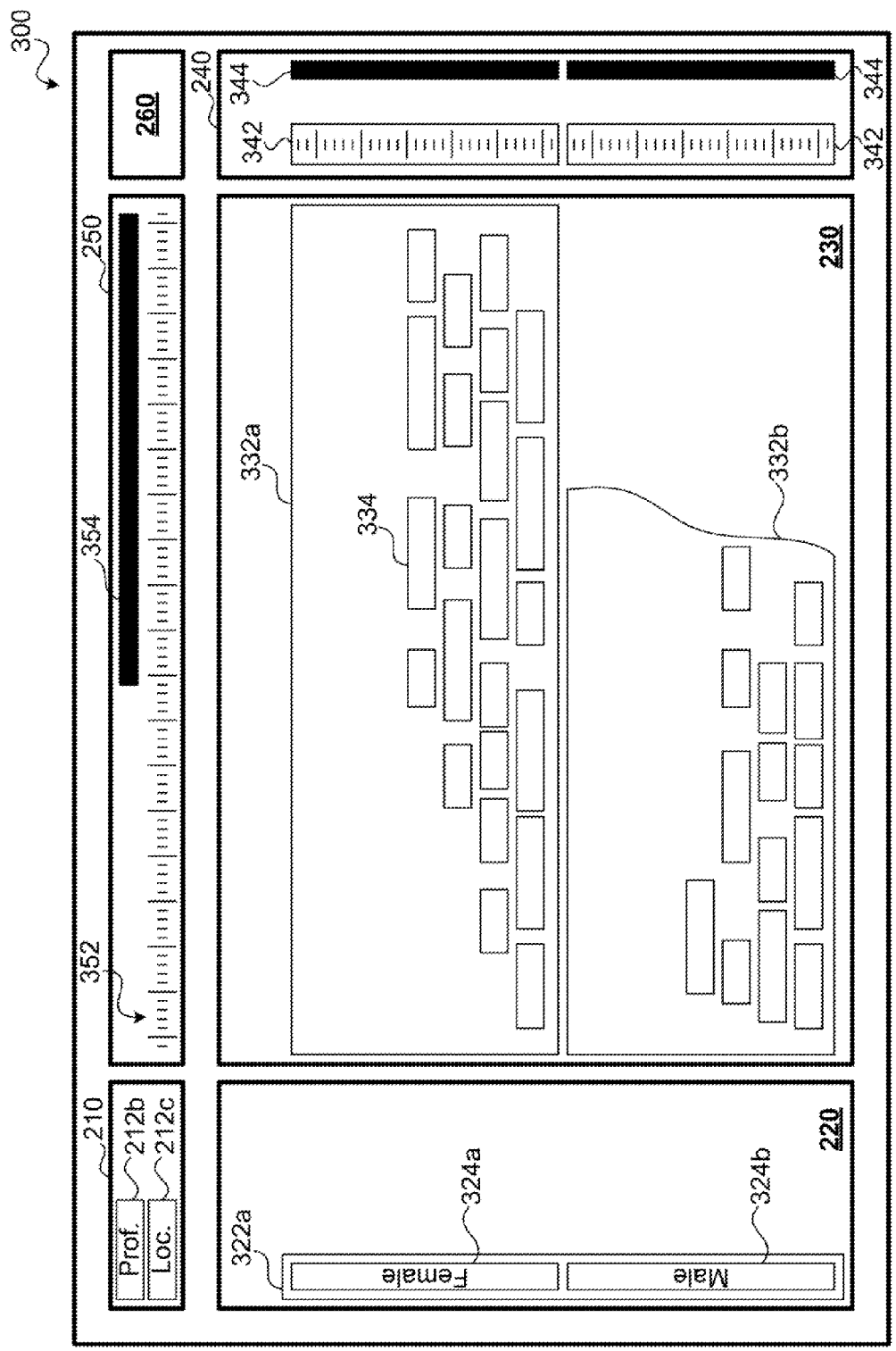

FIG. 3 is a representation of a display 300 of the first example GUI. In the first example GUI, the display 300 is presented after the gender facet icon 212a has been selected.

As shown in display 300, the gender facet icon 212a has been removed from the facet selection area 210 to indicate its selection. However, in other examples, visual features, such as those described above, may be employed to indicate the selection of facet icon 212.

In one example, the hierarchical depiction area 220 is configured to display a hierarchical depiction of facet metadata elements of selected facets (e.g., the selected facets and facet attributes thereof) and to illustrate relationships between displayed facet metadata elements. The illustrated relationships may include relationships defined by the dataset 100 as well as relationships defined during interaction with the hierarchical depiction area 220 or other portions of the GUI. The hierarchical depiction area 220 may also serve as an interface for interacting with the hierarchal depiction. For example, interactions with the hierarchical depiction may include defining relationships between facet metadata elements, controlling the size and positions of facet metadata element representations, and initiating or controlling other operations on the hierarchal depiction. More specifically, these interactions may include adding or deleting facets, linking or unlinking facet metadata elements, grouping or ungrouping facet metadata elements, changing orderings of facet metadata elements, reordering facet metadata hierarchies, collapsing and uncollapsing facet metadata elements, and resizing facet metadata elements.

In the example illustrated by FIG. 3, changes have been made to the hierarchical depiction area 220 relative to FIG. 2. For example, the facet representation 322a (generically or for plural reference 322) has been added to the hierarchical depiction area 220 to indicate the selection of the gender facet icon 212a. In addition, the female and male facet attribute representations 324a and 324b (generically or collectively 324) have been embedded into the facet representation 322a. In this example, the inclusion of the facet attribute representations 324a and 324b within the facet representation 322a depicts the relationship between the facet 120 and the facet attributes 130 thereof. Specifically, the inclusion of facet attribute representations 324a and 324b in facet representation 322a indicates that the gender facet 120a includes female and male facet attributes 130a and 130b.

In one example, the dataset display area 230 provides a location for viewing visual representations of subsets 150. As introduced above, these visual representations may be dynamically generated based on the facet metadata elements and/or relationships displayed in the hierarchical depiction area 220. These visual representations may also be temporal visual representations or be otherwise organized by the linear attributes 140 of the represented entries 110. The dataset display area 230 may also provide an interface for interacting with displayed visual representations and/or elements thereof.

The dataset display area 230 now includes visual representations 332a and 332b (generically or collectively 332). The visual representations 332 are visual depictions of the subsets 150 represented by corresponding facet attribute representations 324 of the hierarchical depiction area 220. For example, the visual representation 332a corresponds to female facet attribute representation 324a and thus depicts the subset of entries 110 with the female facet attribute 130a. Likewise, the visual representation 332b corresponds to male facet attribute representation 324b and thus depicts the subset of entries 110 with the male facet attribute 130b.

In the display 300, the visual representations 332a and 332b are chronological "lifespan" displays in which each represented entry 110 is represented by a separate entry icon 334. The visual representations 332a and 332b are also organized according to linear attributes associated with each of the entry icons 334. More specifically, the visual representations 332a and 332b are temporal displays in which positions along the x-axis connote points in time. In this particular example, the left and right edges of the entry icons 334 respectively represent the birth and death of the represented individual. In addition, the entry icons 334 may display information such as a name of the represented entry, an image of the represented entry, or other information regarding the represented entry.

The visual representations 332 or entry icons 334 may also enable further interaction with the dataset 100 or entries 110 thereof. For example, information regarding a particular entry 110 may be retrieved from dataset 100 by hovering over its entry icon 334. As another example, information regarding a subset 150 may be retrieved from the dataset 100 or another source by hovering over, clicking on, or tapping on a visual representation 332. As yet another example, an Internet search could be initiated by clicking on an entry icon 334. Other interactions with the visual representations 332 or entry icons 334 are possible.

In this specific example, the dataset display area 230 includes one automatically generated visual representation 332 for each subset 150 represented in the hierarchical depiction area 220, e.g., an automatic one-to-one correspondence between displayed visual representations and represented subsets. However, other GUIs may not provide an automatic one-to-one correspondence. For example, another GUI may include an interface for toggling or otherwise controlling whether a visual representation 332 is displayed for particular subsets represented in the hierarchical depiction area 220.

The visual representations 332 may also be aligned to corresponding facet attribute representations 324 of hierarchical depiction area 220. For example, horizontal or other alignment may be employed indicate the facet attributes 130 of a particular visual representation 332. In the display 300, the visual representations 332 are horizontally aligned to their respective facet attribute representations 324. Specifically, the visual representation 332a is horizontally aligned with the facet attribute representation 324a, e.g., to indicate that the visual representation 332a is of a female subset 150. Likewise, the visual representation 332b is horizontally aligned with the facet attribute representation 324b, e.g., to indicate that it represents a male subset 150. However, the visual representations of some GUIs are not aligned to corresponding facet attribute representations (e.g., display 900 of FIG. 9).

Vertical indexes 342 and a horizontal index 352 and are now respectively shown in the vertical and horizontal reference areas 240 and 250. In one example, the indexes 342 and 352 are references for visually quantifying values associated with y- and x-axis positions of the visual representations 332. In this example, the vertical indexes 342 illustrate quantities of entries represented by various y-axis positions while the horizontal index 352 is a timeline index. Although not illustrated in the display 300, indexes 342 and 352 may also include labels indicating the scale of the indexes.

Vertical scroll bars 344 and a horizontal scroll bar 354 are also respectively shown in the vertical and horizontal reference areas 240 and 250. In one example, the vertical scroll bars 344 and the horizontal scroll bar 354 provide an interface for scrolling the visual representations 332. The scroll bars 344 and 354 may also be references to the scale of the visual representations 332 (e.g., the zoom factor) or as a reference to the displayed portion of the visual representation 332 (e.g., top, bottom, right or left). In the case of the vertical scroll bars 344, multiple scroll bars are shown, e.g., to enable independent y-axis scrolling of the individual visual representations 332. However, a vertical scroll bar for scrolling multiple visual representations 332 and/or the entirety of dataset display area 230 may alternatively or additionally be provided.

The display 300 also includes a control area 260. Although the individual controls of the control area 260 are not illustrated in FIG. 3, the control area 260 may include controls for initiating or controlling any of the operations described herein. In addition, control area 260 may include controls for initiating or controlling other operations, e.g., zooming, panning, resetting scales or viewpoints, changing visual representation types, or loading or otherwise accessing datasets. Any of the operations described or mentioned herein may also be initiated or controlled through any other suitable action, e.g., key strokes, mouse actions, or touch-screen interactions.

Figure 4:
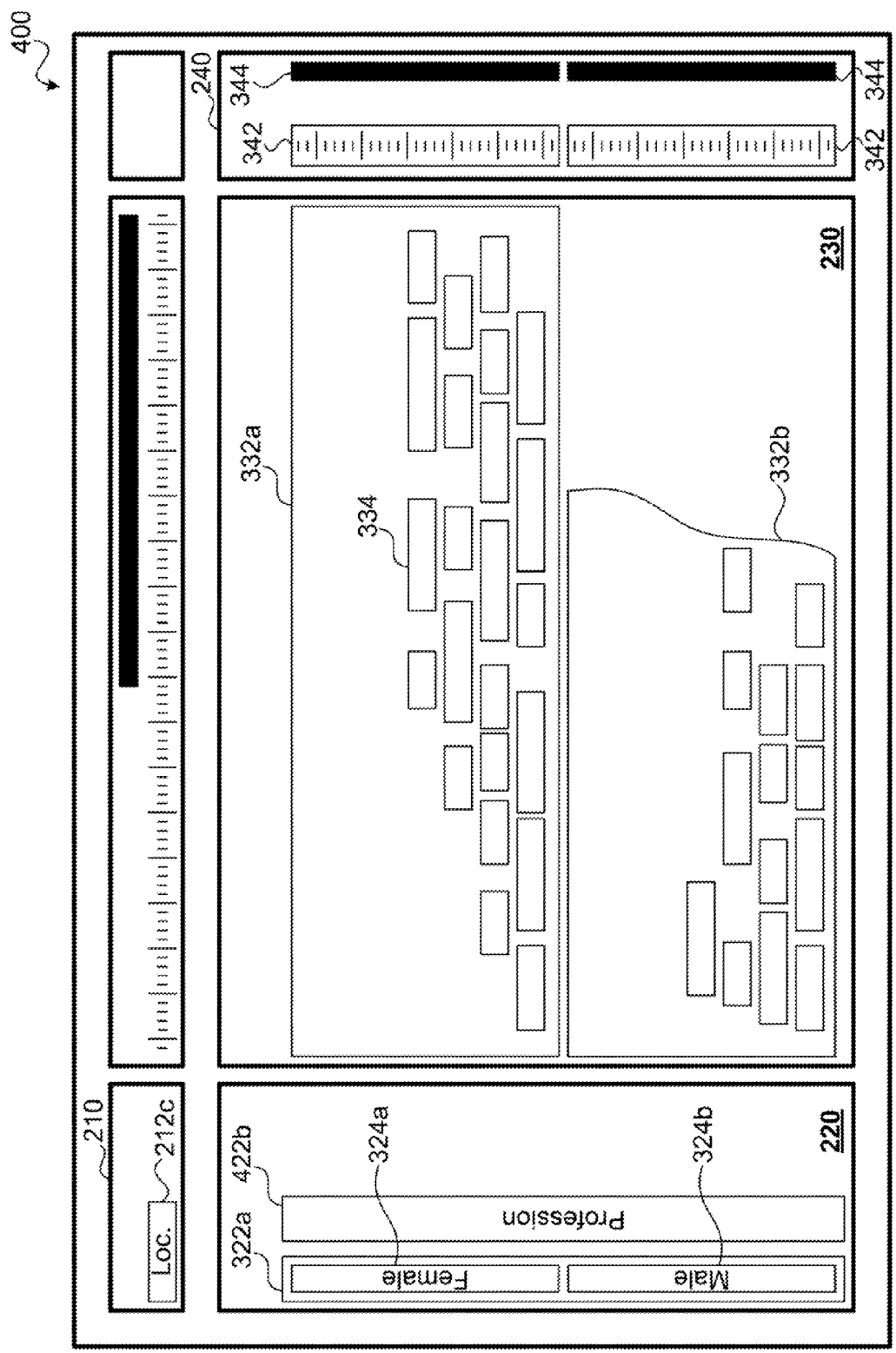

FIG. 4 is a representation of a display 400 of the first example GUI. In the first example GUI, the display 400 is presented after the profession facet icon 212b has been selected.

As shown in the display 400, the profession facet icon 212b has been removed from the facet selection area 210 and a profession facet representation 422b (generically or for plural reference 322) has been added to the hierarchical depiction area 220. No changes are shown to the dataset display area 230. In this example, the system has not received an indication of the relationship between the facet representations 322a and 422b of the facets represented thereby. Accordingly, facet attribute representations 324 are not shown in the facet representation 422b and visual representations 332 for the facet representation 422b are not shown the dataset display area 230.

However, other GUIs may behave differently before indications of relationships between facet representations 322 or facets are received. For example, facet representation 422b may be treated as an additional "top-level" facet representation 322 and be displayed at a vertical offset from the facet representation 322a. In this specific example, visual representations 332 for the facet representation 422b may then be displayed in a corresponding portion of the dataset display area 230.

As another possible alternative, one or more links between the facet metadata elements of the displayed facet representations 322 may be automatically established by the system. For example, such links may be established based on the respective numbers of facet attributes for each displayed facet representation 322, on a hierarchy defined in metadata, or on the order in which facet icons 212 are selected. Additionally, one or more links may be established based on the relative positions of facet attribute representations 324 in the hierarchical depiction area 220 or on any other suitable criteria or processes. In such examples, visual representations 332 for facet attributes combinations defined by the automatically established links may be dynamically added to the dataset display area 230. Further description of linking and of facet attribute combinations is provided in conjunction with FIG. 5.

Figure 5:
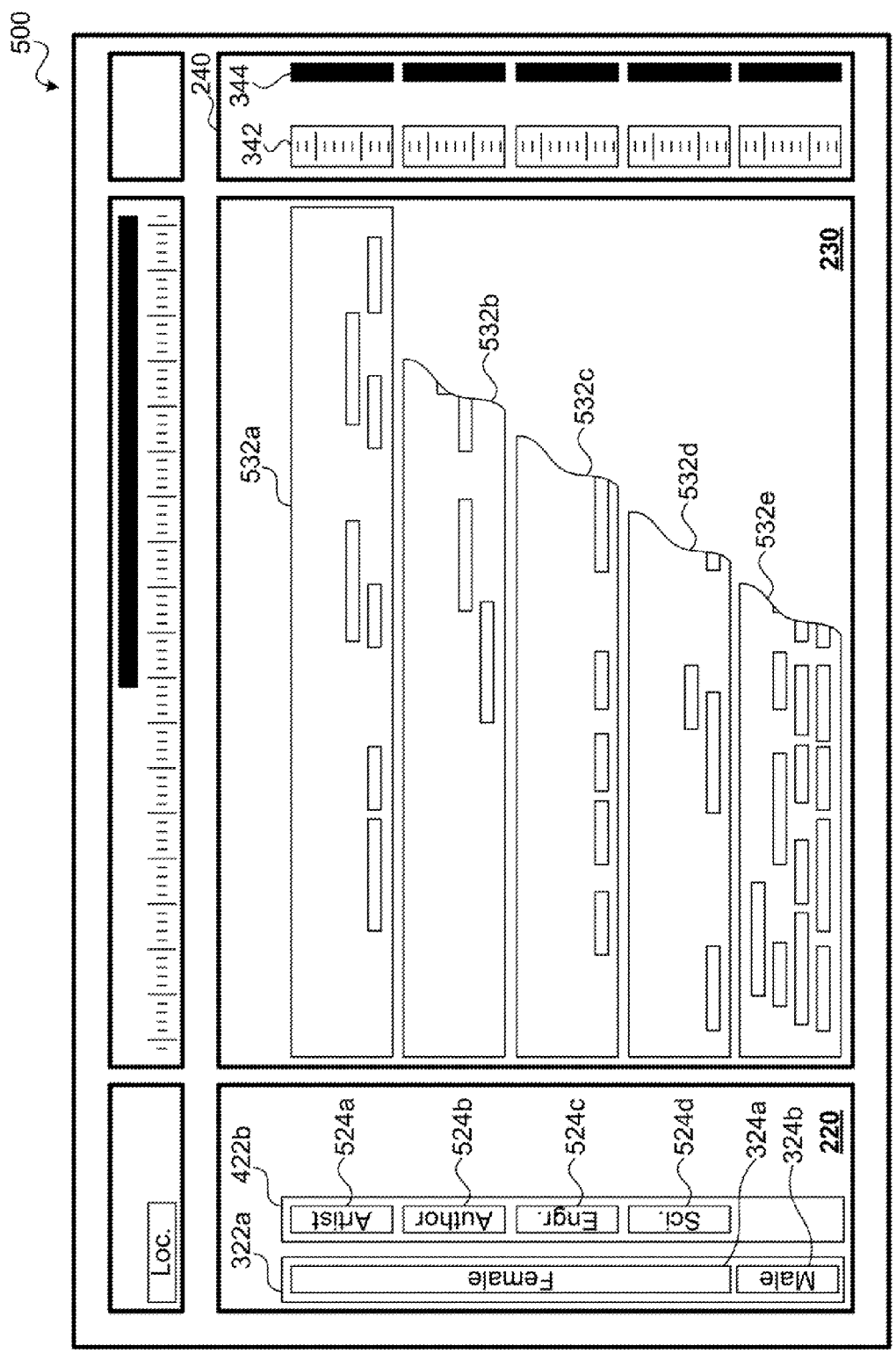

FIG. 5 is a representation of a display 500 of the first example GUI. In the first example GUI, the display 500 is presented after the facet representation 422b has been linked to the female facet attribute representation 324a of the facet representation 322a.

As shown in the display 500, the hierarchical depiction area 220 now depicts this aforementioned relationship via the positioning of the facet attribute representations 524a-524d (generically 324) in the profession facet representation 422b relative to the female facet attribute representation 324a. In addition, the visual representations 332a and 332b have been replaced with visual representations 532a-532e (generically 332). Corresponding changes have been made to the vertical indexes 342 and scrod bars 344 of the vertical reference area 240.

As introduced above, relationships may be established between facet metadata elements and their representations via the hierarchical depiction area 220. For example, links between facet metadata elements may be established to "drill-down" into facets 120 or facet attributes 130 of interest and to render visual representations of divided or subdivided subsets 150. Links between facet metadata elements may be manually established via any suitable action or combination of actions. By way of an example, a link may be established between a facet attribute 130 and a facet 120 by dragging a facet representation 322 onto a facet attribute representation 324 (e.g., dragging the profession facet representation 422b onto the female facet attribute representation 324a) or by dragging a facet attribute representation 324 onto a facet representation 322 (e.g., dragging the female facet attribute representation 324a onto the profession facet representation 422b). Additionally, a link may be established by selecting a facet attribute representation 324 and selecting a "link" icon to drill-down into an unlinked facet attribute representation 322. As yet another option, links between facets may be established by dragging a facet representation 322 onto another facet representation 322. In this last option, a large number of links, e.g., a full matrix of links between the facet attributes of the linked facets, may be generated.

A facet attribute combination may be formed for every unique combination of facet attributes created by linking the facet metadata elements. The formed facet attribute combinations may also be depicted in the hierarchical depiction area 220, e.g., by relative positions of the facet attribute representations 324. For example, facet attribute combinations are depicted in the display 500 by the respective vertical positions of the facet attribute representations 324a and 524a-524d. More specifically, the facet attribute combinations are represented in the display 500 by the sharing of any horizontal line through the hierarchical depiction area 220 by two or more facet attribute representations 324.

As stated above, the dataset display area 230 may be dynamically changed based on relationships depicted in the hierarchical depiction area 220. For example, the entries 110 of subsets 150 corresponding to each facet attribute and/or facet attribute combination represented in the hierarchical depiction area 220 may be dynamically determined and visual representations 332 of these subsets 150 may be dynamically added to the dataset display area 230. Additionally, visual representations 332 may be dynamically removed as changes are made in the hierarchical depiction area 220.

Here, visual representations 332 have been dynamically added and removed from dataset display area 230 in the aforedescribed manner. Specifically, visual representation 332a has been removed from dataset display area 230 and visual representations 532a-532d, which represent combinations the female facet attribute with the facet attributes of the profession facet 120b, have been added to the dataset display area 230.

The sizes and/or positions of facet attribute representations 324 or facet representations 322 in the hierarchical depiction area 220 may also be dynamically adjusted as operations are performed, e.g., to allocate display space amongst the displayed facet attribute representations 324 and facet representations 322 or to focus attention on specific portions of the displayed data. For example, the heights of facet attribute representations 324 may be automatically adjusted to maintain approximately equal vertical space for the facet attribute representations 324 of each represented subset 150. However, other alternatives for automatically allocating space to facet attribute representations 324 are also possible.

If the sizes and/or positions of the hierarchical depiction area 220 are dynamically aligned or otherwise linked to the dataset display area 230, visual representations 332 in the dataset display area 230 may also be dynamically resized or repositioned as the corresponding representations in the hierarchical depiction area 220 are adjusted. For example, contracting (e.g., shrinking or minimizing) a facet attribute representation 324 of hierarchical depiction area 220 may involve dynamically minimizing or otherwise contracting a corresponding visual representation 332.

Here, the visual representation 532e has been dynamically resized from visual representation 332b in the aforedescribed manner. Specifically, the male facet attribute representation 324b was collapsed to provide space for the facet attribute combinations of the female facet attribute representation 324a and the visual representation 532e was corresponding resized.

Figure 6:
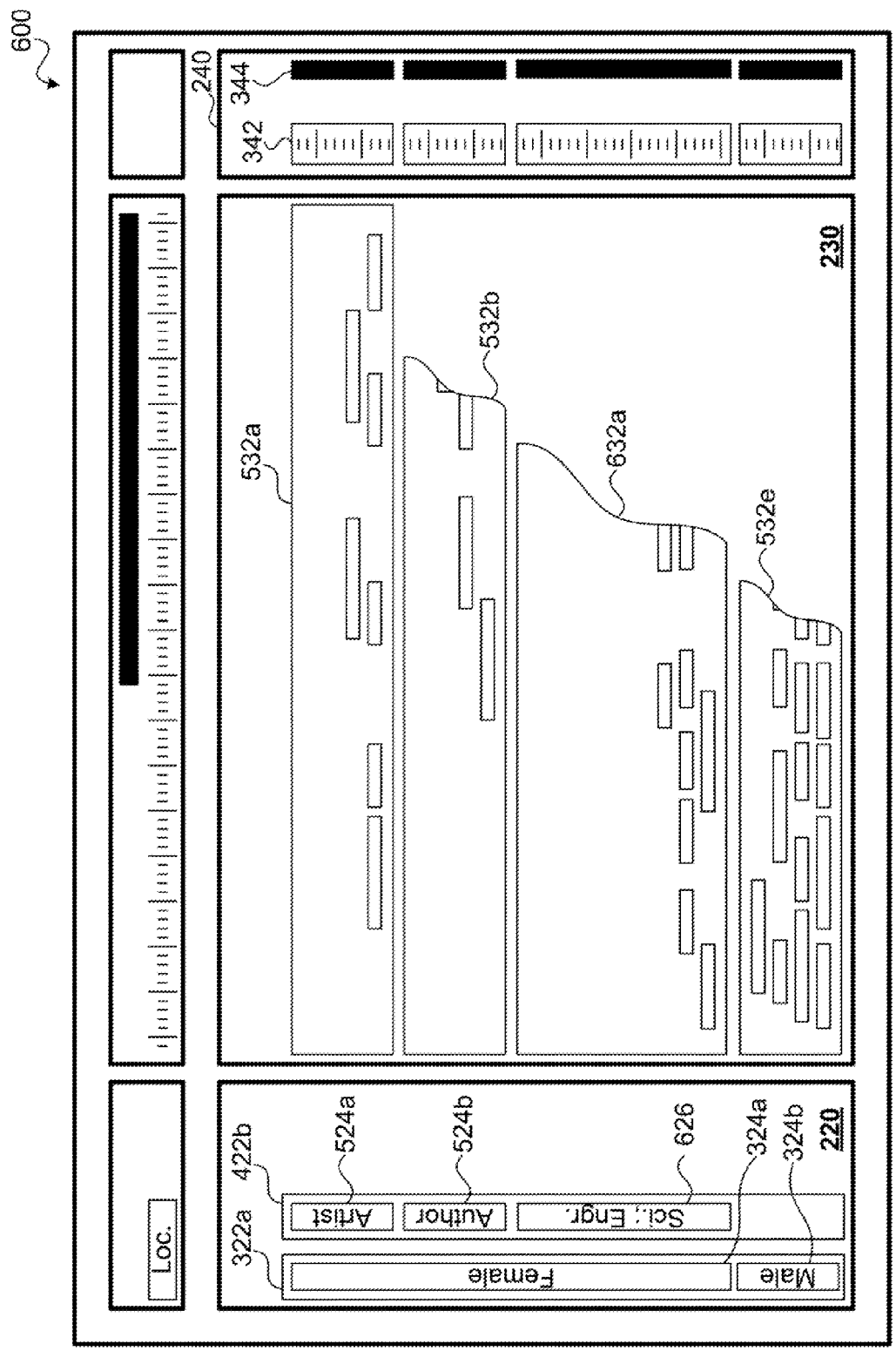

FIG. 6 is a representation of a display 600 of the first example GUI. In the first example GUI, the display 600 is presented after the engineer and scientist facet attributes have been grouped, as further described below, into a facet attribute group.

As shown in the hierarchical depiction area 220, the facet attribute representations 524c and 524d of the display 500 have been replaced with a facet attribute group representation 626. Correspondingly, visual representations 532c and 532d have been replaced with visual representation 632a. As with prior figures, corresponding changes have been made to the vertical reference area 240.

As illustrated by the display 600, facet attribute groups may be formed to collectively represent entries 110 that are associated with any of the facet attributes 130 of the facet attribute group. These facet attribute groups may be depicted in the hierarchical depiction area 220 in many ways. For example, in the display 600, labeling (e.g., "Sci.; Engr.") is shown to delineated the facet attribute group representation 626 from other facet attribute representations 324. However, nested bubbles, alternate colors, alternate sizes, outlines, or other features could alternatively or additionally be used to distinguish other facet attribute group representations 626 from other facet attribute representations 324. Additionally, such color and visual cues can be used to distinguish members of a grouped set in both facet attribute group representations 626 and in visual representations 332.

Facet attribute groups may also be formed in a variety of ways. For example, facet attribute groups may be formed by dragging one facet attribute representation 324 onto another representation, by highlighting or otherwise selecting multiple facet attribute representations 324 then performing a grouping action (e.g., clicking or tapping a grouping icon, performing a grouping gesture, or pressing a grouping key combination). As another example, facet attribute groups may be formed by creating a "shell" facet attribute group (e.g., via a button, icon, or menu) then dropping facet attribute representations 324 into the created shell.

Once a facet attribute group is formed, the entries 110 of a subset 150 for the facet attribute group may be determined. Additionally, if the facet attribute group is divided or subdivided (e.g., linked to a facet 120), entries 110 for each of multiple subsets 150 of the facet attribute group may be determined. Visual representation(s) 332 of the subset(s) 150 of the facet attribute group may then be placed into the dataset display area 230.

In the specific example of FIG. 6, the facet attribute representations 524c and 524d have been replaced with a facet attribute group representation 626 to indicate the formation of the engineer+scientist facet attribute group. In addition, visual representations 532c and 532d have been replaced with the visual representation 632a which represents the entries 110 having the female attribute of the gender facet and the engineer and/or scientist facet attribute of the profession facet.

Figure 7:
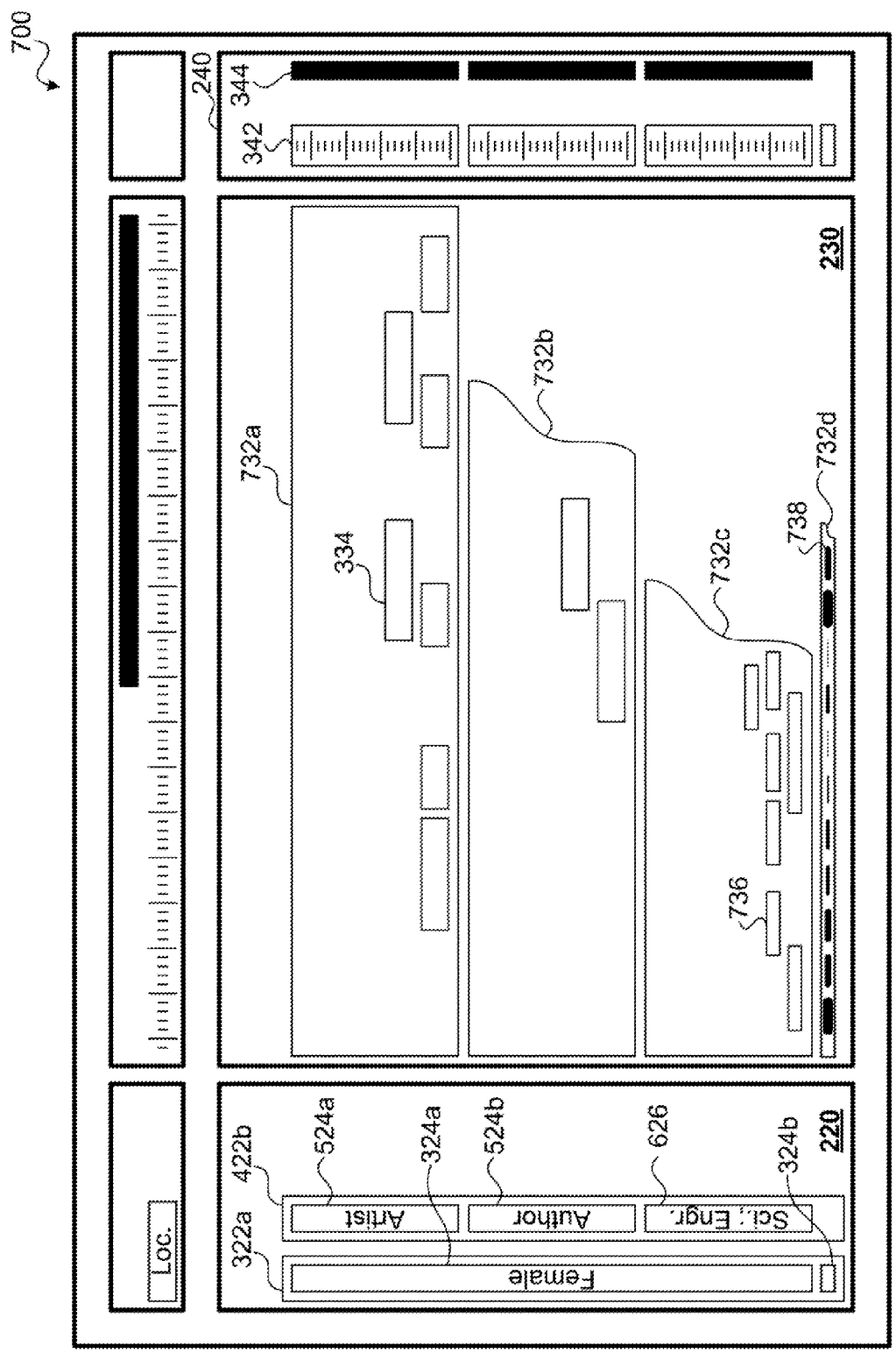

FIG. 7 is a representation of a display 700 of the first example GUI. The display 700 represents the same subsets as the prior display 600 and illustrates visual representations 732a-732d of different types and sizes.

In the display 700, visual representations 732a and 732b are chronological "lifespan" displays (previously described in conjunction with FIG. 3) in which each entry 110 of the represented subset 150 is represented by a separate entry icon 334. As previously described, these entry icons 334 enable various interactions with the dataset 100 or other information sources.

In contrast to visual representations 732a and 732b, a visual representation 732c is a condensed lifespan display in which each entry 110 of the represented subset 150 is represented by a separate condensed entry icon 736. The condensed entry icons 736 may enable similar interactions as enabled by entry icons 334. However, condensed entry icon 736 may display less information than entry icon 334. As one example, condensed displays may be employed to increase, relative to non-condensed displays, the number of entries displayed within a given area.

In contrast to visual representations 732a-732c, a visual representation 732d is a heat map that displays aggregated information regarding its corresponding subset 150 by way of multiple aggregated representations 738. In one example, each of these aggregated representations 738 represents information aggregated from the corresponding subset 150 for a period through use of varying colors, widths, thicknesses, and/or the like. The period represented by each aggregated representation 738 may be based on a scale of the visual representation 732d, e.g., the granularity of information may change as the visual representation 732d is scaled.

In the context of the display 700, the aggregated representations 738 may represent a quantity of represented individuals alive during a particular century, a quantity of events related to represented individuals that occurred during a particular year (e.g., births, deaths, production of notable works), or other information regarding the represented individuals.

In addition to freeing space for other visual representations 332, minimized visual representation 732d may also enable additional modes of interacting with the dataset 100. For example, minimized visual representations may enable efficient and/or concurrent visualization of a large number of subsets 150. As one such example, minimized visual representations 732d for a large number of a subsets 150 could be concurrently viewed, e.g., to locate or search for high-level patterns, trends, anomalies, relationships, or other qualities of the dataset 100. As another example, minimized visual representations 732d could be viewed while interacting with other visual representations 332, e.g., to efficiently obtain an overview of a portion of the dataset 100 or to gain additional insight into the dataset 100.

In addition to the above-described dynamic resizing and/or repositioning of facet attribute representations 324, facet representations 322, and visual representations 332, these representations may be manually resized and/or repositioned. For example, the size of these representations may be adjusted by dragging an edge of the representation, through a "minimize" or "maximize" icon, through a menu command, or by any suitable action or combination of actions.

As another possible option, the visual representation type(s) within dataset display area 230 may be manually or automatically selected. As one example, visual representation types may be manually selected by utilizing a menu command, clicking an icon, or by any other suitable action or combination of actions. As another example, visual representation types may automatically selected based on any suitable criteria, e.g., an amount of space allocated to a visual representation, information contained within the dataset, the size of a subset or dataset, or a type of a selected facet.

Although dataset display area 230 of FIGS. 2-7 is illustrated as providing lifespan, condensed lifespan, and heat map visual representations, the technology is not limited to these particular types of visual representations. For example, other visual representations could include histograms, bar charts, line charts, or indications of a quantity of entries in a represented subset or a portion thereof. Moreover, any type of visual representation suitable for a target dataset or subset may be displayed.

Figure 8:
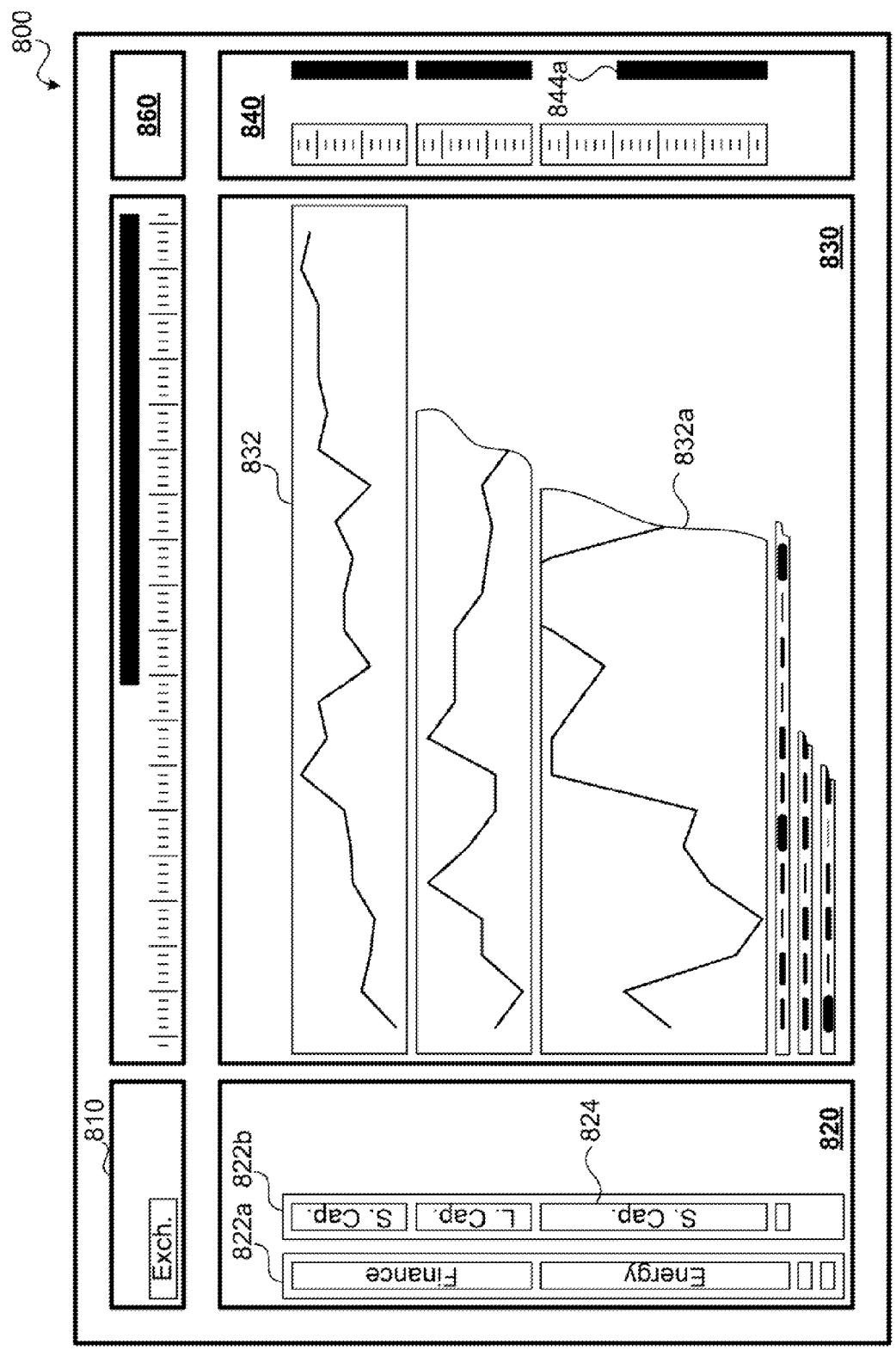

FIG. 8 is a representation of a display 800 of another example GUI and provides an illustration of another type of visual representation. The display 800 is illustrated in reference to a dataset of financial market data. For the sake of brevity, aspects of FIG. 8 that are similar to previously described aspects will not be described in detail. In the example of FIG. 8, the entries of the illustrated dataset represent individual companies and the dataset is associated with facets for the industry sectors, stock exchanges, and market capitalization of the represented companies. Likewise, each of the entries is associated with the linear attributes of time and share price.

In contrast to the GUI of FIGS. 2-7, the visual representations 832 of dataset display area 830 of FIG. 8 are illustrated as temporal line charts. As one specific example, the y-axis values of the visual representations 832 graphically represent values aggregated from entries of the corresponding facet attribute combinations for specific points in time. For example, these aggregated values may represent average instantaneous share prices for companies having the corresponding facet attributes or an instantaneous price change of the most active company having the corresponding set of facet attributes.

The display 800 also includes an example of a scaled visual representation 832a. As shown, the scaled visual representation 832a provides a zoomed view of a portion of the line chart. In this illustration, a vertical scroll bar 844a indicates the scale and relative position of the scaled visual representation 832a.

Figure 9:
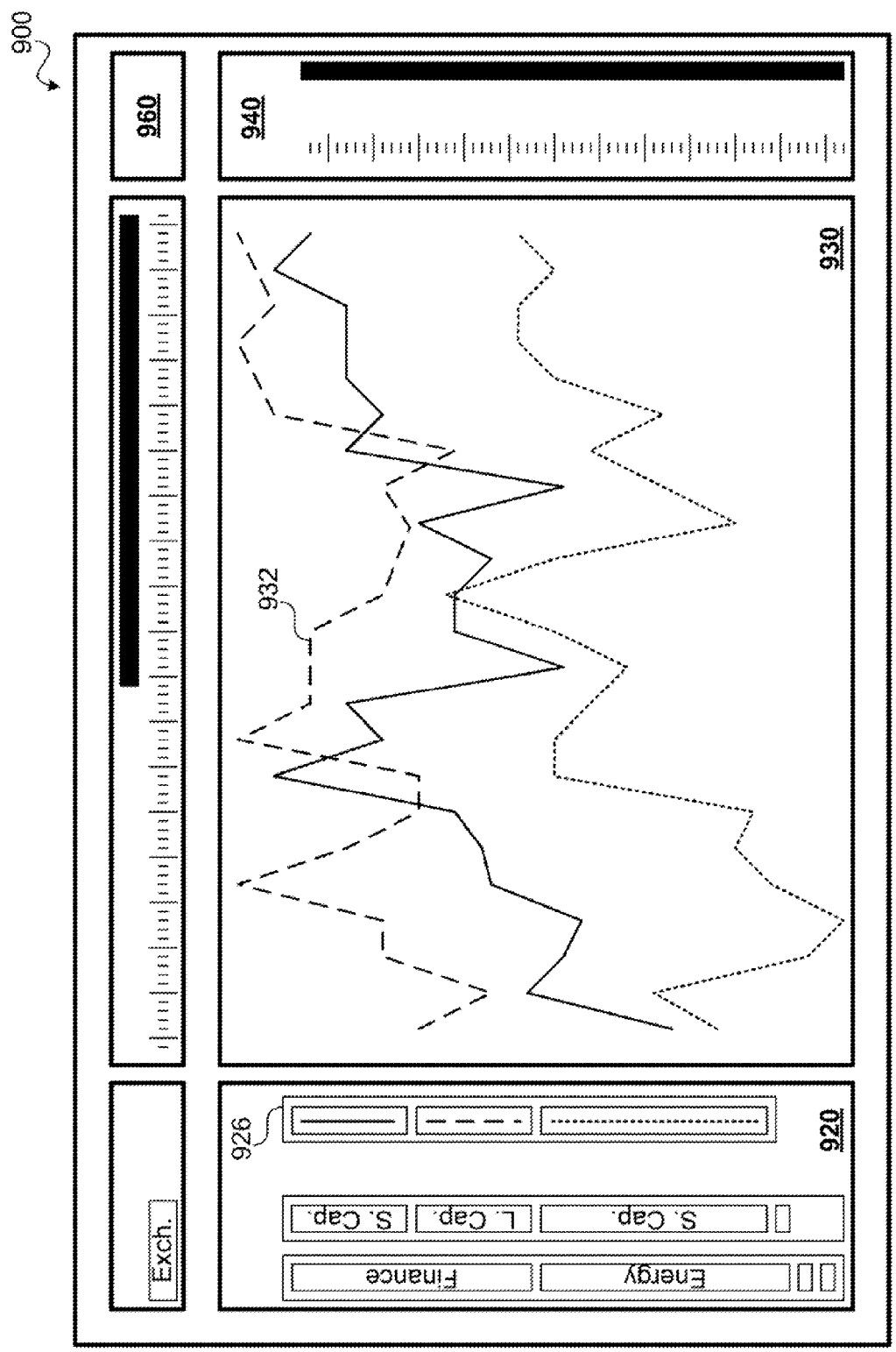

FIG. 9 is a representation of a display 900 of yet another example GUI and provides an illustration of yet another type of visual representation. In contrast to the previously described displays, the dataset display area 930 of the display 900 is configured as a shared display area. In this example, the visual representations 932 are overlaid upon each other. In addition, the hierarchical depiction area 920 also includes legend 926. As shown, legend 926 is aligned to the hierarchal depiction, e.g., to provide a reference between the visual representations 932 and the corresponding facet attributes. However, the legend 926 may be omitted from other displays or other another reference may be provided.

Illustrative Processes

Figure 10:
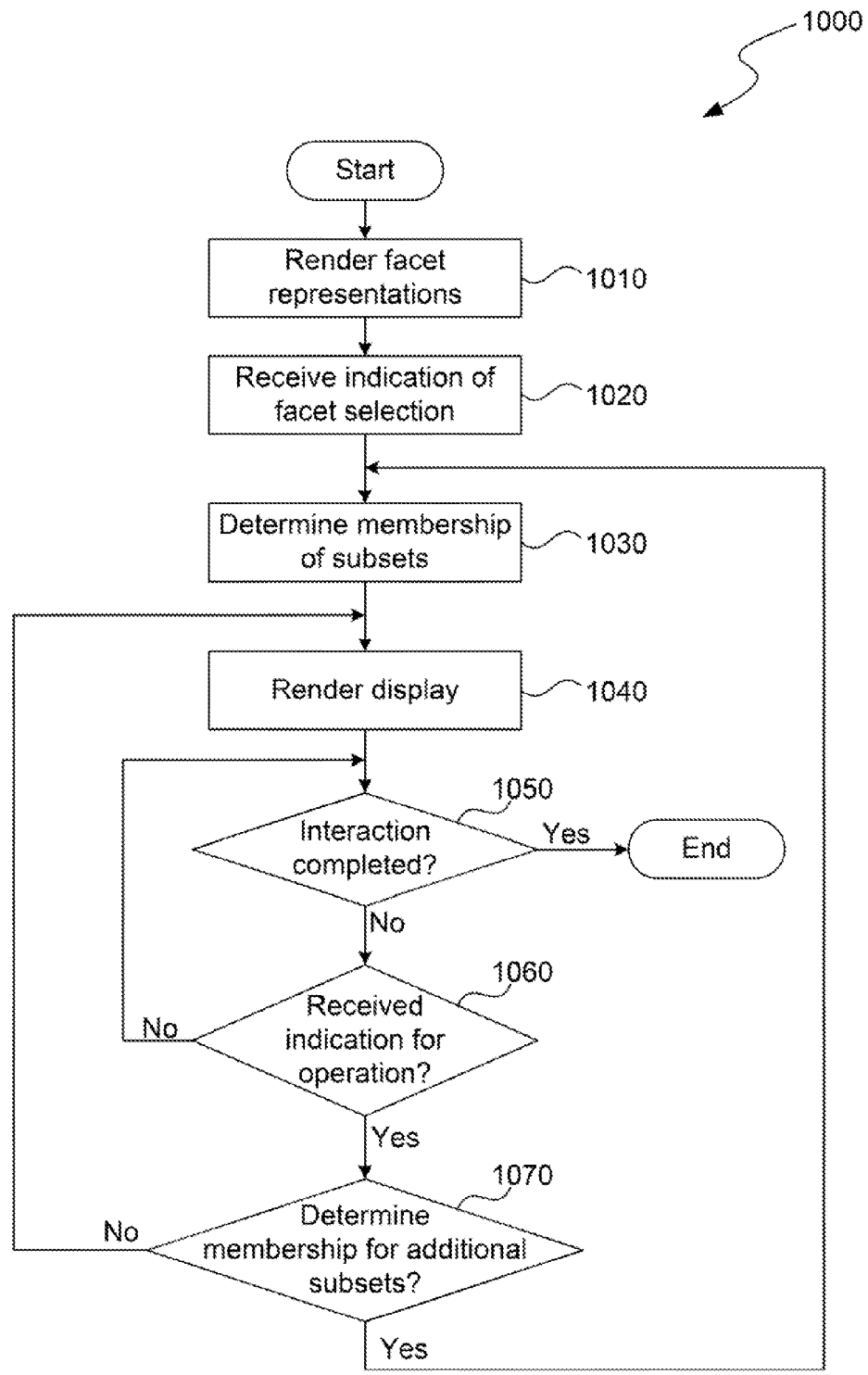
FIG. 10 is a logical flow diagram illustrating a process for rendering visual representations of subsets of a dataset.

FIG. 10 illustrates a process 1000 for rendering displays from a multi-faceted dataset. For clarity, the process 1000 is described in terms of acts performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, technology described in conjunction with the preceding figures may be incorporated into the process 1000 and/or other processes, whether or not that technology is specifically described in conjunction with the process 1000. The process 1000 and other processes may also be performed on or by other devices, components, or systems, whether or not such devices, components, or systems are described herein. The process 1000 and other processes may also be embodied in a variety of ways. For example, they may be embodied on an article of manufacture, e.g., as processor-readable instructions stored on a computer readable medium or be performed as a computer-implemented process. As yet another example, these processes may be encoded as processor-executable instructions onto one or more data signals.

The process 1000 begins at 1010 where selectable facet icons 212 are rendered, for example, into a facet selection area 210. As one example, a display component may be utilized to render the selectable facet icons 212 for presentation on a separate visual display device. Alternatively, the selectable facet icons 212 may be rendered and presented on a visual display device that is part of the display component.

At 1020, an indication that a facet has been selected is received. In one example, this indication is received by a processor via an input interface. Alternatively, this indication may be received by or via other components or devices. As will also be described at 1040, the representation of the selected facet may be removed from the facet selection area 210 and representations of the selected facet and its facet attributes may be rendered in the hierarchical depiction area 220.

In response to the indication received at 1020, processing flows to 1030. At 1030 the membership of the subsets for each facet attribute of the selected facet are determined. As one example, the membership of a subset is determined by identifying all of the entries of the dataset 100 having the particular facet attribute for that subset. In such an example, determining the membership of each individual subset may include filtering the dataset 100 for entries having that particular facet attribute. Alternatively, determination of subset membership may be skipped for some facet attributes of the selected facet, for example, if visual representations will not be rendered for one or more facet attributes.

Once the entries of the subsets for each facet attribute of the selected facet have been determined, processing flows to 1040 where a display is rendered. At this point, the rendered display could include the facet selection area 210, hierarchical depiction area 220, dataset display area 230, vertical reference area 240, horizontal reference area 250, and the control area 260. In one example, a representation of the selected facet, as well as representations for the facet attributes of the selected facet, are rendered in the hierarchical depiction area 220. In this example, visual representations of the subsets from 1030 are rendered in the dataset display area 230. Optionally, these visual representations are aligned to corresponding portions of the hierarchical depiction area 220. In addition, the facet icons of the selected facet may be removed from the facet selection area 210. As with 1010, the display may be rendered by a display component for presentation on a separate visual display device or be rendered and presented on an integrated visual display device.

Processing then flows to 1050 where it is determined whether process 1000 is complete. For example, process 1000 may be deemed complete if an indication to close the display or to close the dataset is received. If the dataset interaction is deemed complete, process 1000 ends. Otherwise, processing flows to 1060.

At 1060, it is determined whether an indication for an operation was received. As with 1020, this indication may be received by a processor via an input interface or by or via other components or devices. The indication received at 1060 may include indications to perform any of the above-described operations. For example, these operations may include grouping or ungrouping facet attributes, linking or unlinking facets and/or facet attributes, adding facet representations from the hierarchical depiction area 220 (e.g., if an additional facet is selected from the facet selection area 210), deleting facet representations from the hierarchical depiction area 220, or changing the type of one or more visual representations. Additionally, other examples of operations include reordering facet and/or facet attribute representations within the hierarchical depiction area 220, resizing facet and/or facet attribute representations, or scaling or panning one or more visual representations. If an indication for an operation is received at 1060, processing flows to 1070. Otherwise, processing loops to 1050.

In response to the indication received at 1060, processing flows to 1070. At 1070 the handling of the indication from 1060 begins with deciding whether subset membership is to be determined for additional subsets. In one example, this decision is based on whether the operation of 1060 changes the collection of subsets that are to be represented in the dataset display area 230. In this example, grouping or ungrouping facet attributes, linking or unlinking facets and/or facet attributes, or deleting facet representations from the hierarchical depiction area 220 may change the collection of subsets. In contrast, operations such as resizing a facet or facet attribute representation, changing the scale of a visual representation, or panning one or more visual representations may not change the collection of subsets.

If it is decided that the membership for additional subsets should be determined, processing flows to 1030. If processing flows to 1030 from 1060 instead of from 1020, 1030 may include acts in addition to those described above. For example, if facets and/or facet attributes have been linked and/or grouped, 1030 may include determining the set of unique combinations of facet attributes and/or facet attribute groups defined in the hierarchical depiction area 220. In such a scenario, determining membership for each of the individual subsets may include identifying or otherwise selecting the entries of the dataset 100 that include all of the facet attributes for that particular subset. One example of a suitable process for determining the membership of these subsets includes filtering the dataset 100 through a logical set of serially connected filters having one filter for each facet attribute of the subset. In this filtration example, the logical filters are configured to remove entries not having the facet attribute to which that filter is associated.

Once membership for the appropriate subsets have been determined, or if it was determined at 1070 that the membership for additional subsets does not need to be determined, processing flows to 1040 where an updated display is rendered.

Illustrative Devices/Operating Environments

Figure 11:
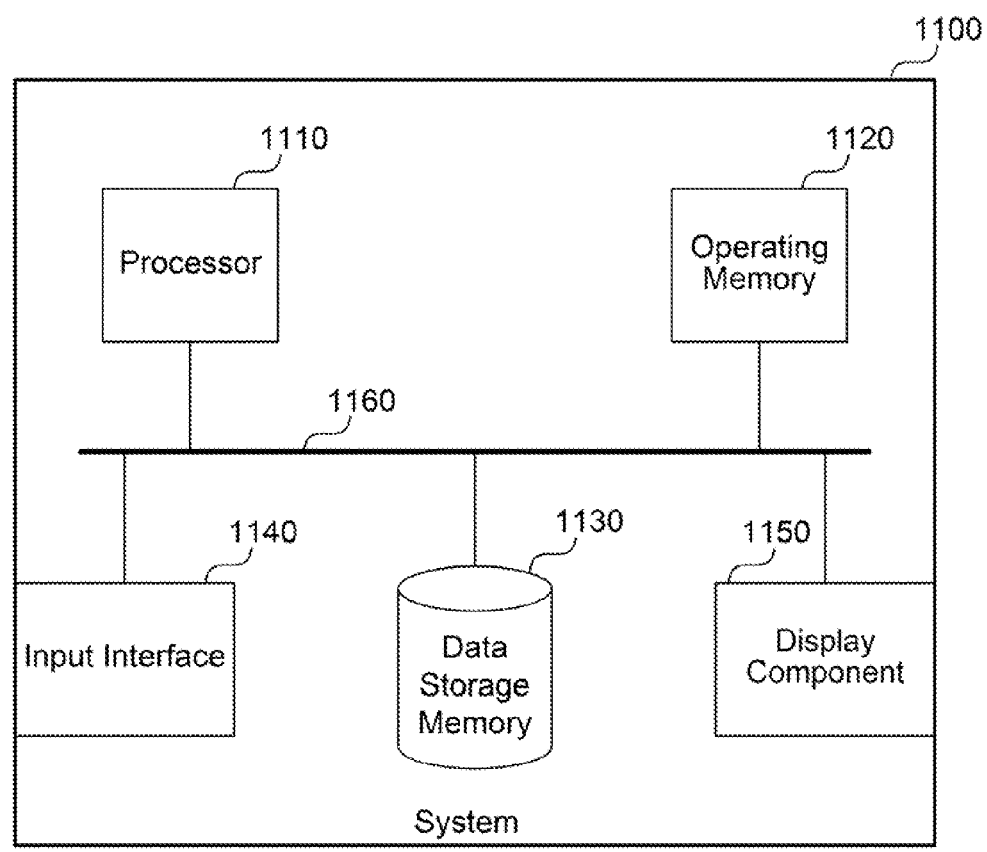
FIG. 11 is a block diagram of a computing device with which aspects of the technology may be practiced.

FIG. 11 is a high-level illustration of example a computing device 1100, which may be used to practice various aspects of the technology. For example, the computing device 1100 may be employed to perform process 1000 of FIG. 10 or to render displays and enable interaction with GUIs, such as those described above. As shown, the computing device 1100 includes a processor 1110, an operating memory 1120, a data storage memory 1130, an input interface 1140, and a display component 1150. These aforementioned components may be interconnected by a bus 1160.

The computing device 1100 may be virtually any type of general or specific purpose computing device. For example, the computing device 1100 may be a client device such as a desktop computer, a laptop computer, a tablet computer, or a mobile communications device. Likewise, the computing device 1100 may be a server device such as an application server computer, a virtual computing host computer, or a file server computer. Additionally, while illustrated as a single device, the computing device 1100 may be a distributed system of multiple devices that are configured to collectively perform tasks described herein as performed by the computing device 1100.

The computing device 1100 includes at least one processor 1110 configured to execute instructions, such as instructions for implementing the above-described processes. Specifically, the processor 1110 may be configured to execute instructions for rendering displays and enabling interaction with GUIs.

The aforementioned instructions, along with other data (e.g., datasets, metadata, operating system instructions, etc.), may be non-transitorily stored in an operating memory 1120 and/or a data storage memory 1130. In one example, the operating memory 1120 is employed for run-time data storage while the data storage memory 1130 is employed for long-term data storage. However, each of the operating memory 1120 and the data storage memory 1130 may be employed for either run-time or long-term data storage. Each of the operating memory 1120 and the data storage memory 1130 may also include any of a variety of data storage devices/components, such as volatile memories, semi-volatile memories, non-volatile memories, random access memories, static memories, disk drives, caches, or buffers.

The computing device 1100 also includes an input interface 1140, which is configured to enable the computing device 1100 to receive input from users or from other devices.

For example, the input interface 1140 may be configured to receive indications regarding facet selection, facet and/or facet attribute relationships, requested operations, and/or the like. The input interface 1140 may also be configured to provide received indications to the processor 1110 or to other components.

In addition, the computing device 1100 includes a display component 1150, which is configured to render displays, e.g., for the above-described example GUIs. In one example, the display component 1150 includes a frame buffer, graphics processor, graphics accelerator, or a virtual computing host computer and is configured to render the displays for presentation on a separate visual display device (e.g., a monitor, projector, virtual computing client computer, etc.). In another example, the display component 1150 includes a visual display device and is configured to render and present the displays for viewing. The display component 1150 may also be configured to render and/or present displays having visual representations of multiple subsets, e.g., so the visual representations of multiple subset can be viewed concurrently.

CONCLUSION

While the above Detailed Description describes certain embodiments of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific embodiments disclosed herein, unless the Detailed Description explicitly defines such terms. Accordingly, the actual scope of the technology encompasses not only the disclosed embodiments, but also all equivalent ways of practicing or implementing the technology.

We claim:

1. A computer-implemented process of rendering representations of dataset entries, comprising:

receiving, by a processor, an indication that a first facet was selected from a plurality of facets associated with a multi-faceted temporal dataset, wherein the multi-faceted temporal dataset includes a plurality of entries having one or more temporal attributes, wherein the entries are associable to a plurality of facets, and wherein each of the facets has multiple facet attributes associated therewith;

in response to receipt of the indication, determining entries of a first subset such that the first subset includes all the entries of the dataset that are associated with a first facet attribute, wherein the first facet attribute is associated with the first facet;

in response to receipt of the indication, determining entries of a second subset such that the second subset includes all the entries of the dataset that are associated with a second facet attribute, wherein the second facet attribute is associated with the first facet;

rendering, with a display component, a first visual representation of the entries of the first subset, wherein the first visual representation is organized according to the temporal attributes of the entries of the first subset; and rendering, with the display component, a second visual representation of the entries of the second subset, wherein the second visual representation is organized according to the one or more temporal attributes of the entries of the second subset and is rendered for concurrent display with the first visual representation, wherein the entries of the first subset and the entries of the second subset are further organized according to a common temporal reference, and wherein the entries of the first subset and the entries of the second subset are individually aligned to points of the common temporal reference representing the temporal attributes of the individual entries.

2. The computer-implemented process of claim 1, wherein rendering the first visual representation includes:
    rendering, with the display component, the first visual representation in alignment with a timeline.

3. The computer-implemented process of claim 1, wherein first and second visual representations are configured to enable visual comparison of the first subset to the second subset.

4. The computer-implemented process of claim 1, wherein rendering the second visual representation includes:
    overlaying the second visual representation over the first visual representation.

5. The computer-implemented process of claim 1, wherein the first and second visual representations each includes at least one of a histogram, a bar chart, a line chart, a heat map, an indication of a quantity of entries in a respective subset or portion thereof, and discrete representations of the entries of the respective subset.

6. The computer-implemented process of claim 1, further comprising:
    receiving, by the processor, an indication that a second facet was selected from the plurality of facets;
    receiving, by the processor, an indication of a relationship between the first and second facets; and
    rendering, with the display component, a hierarchical depiction of the first and second facets, the facet attributes associated with the first and second facets, and the indicated relationship between the first and second facets.

7. The computer-implemented process of claim 6, further comprising:
    determining a set of facet attribute combinations, wherein the set of facet attribute combinations includes one facet attribute combination for each facet attribute of the second facet, and wherein the facet attributes of each facet attribute combination include the first facet attribute and the facet attribute of the second facet corresponding to that facet attribute combination;
    for each determined facet attribute combination, determining the entries of a combined subset that includes the entries of the dataset that are associated with all of the facet attributes of that facet attribute combination; and
    rendering, with the display component, additional visual representations of each of the combined subsets.

8. The computer-implemented process of claim 7, further comprising:
    receiving, by the processor, an indication that an operation is to be performed on the hierarchical depiction;
    performing the indicated operation on the hierarchical depiction; and
    modifying the rendered visual representations in correspondence to the performance of the indicated operation.

9. The computer-implemented process of claim 7, wherein rendering the additional visual representations includes:
    aligning each visual representation with a portion of the hierarchal depiction that corresponds to all of the facet attributes of that visual representation.

10. The computer-implemented process of claim 9, further comprising:
    receiving, by the processor, an indication that an operation is to be performed on the hierarchical depiction, wherein the operation is a reordering or a resizing of any of the first facet, the facet attributes associated with the first facet, the second facet, and the facet attributes associated with the second facet;
    performing the indicated operation on the hierarchical depiction; and
    modifying the visual representations of the combined subsets such that the visual representations remain aligned to the respective portions of the hierarchal depiction corresponding to the facet attributes of the respective subset.

11. The computer-implemented process of claim 6, further comprising:
    receiving, by the processor, an indication that a depiction of a particular facet attribute is to be contracted, wherein the depiction corresponds to one or more of the rendered additional visual representations;
    contracting, within the hierarchical depiction, the selected depiction of the particular facet attribute; and
    contracting the one or more corresponding visual representations.

12. The computer-implemented process of claim 6, further comprising:
    receiving, by the processor, an indication that two or more of the facet attributes associated with the first facet are to be grouped together;
    grouping the two or more facet attributes together in the hierarchical depiction;
    for each facet attribute associated with the second facet, determining the entries of a grouped subset that includes the entries of the dataset that are associated with both (1) the particular facet attribute associated with the second facet and (2) any of the two or more facet attributes associated with the first facet.

13. The computer-implemented process of claim 1, further comprising:
    automatically selecting one or more representation types for the visual representations based upon the dataset and/or the first facet, wherein each selected representation types is at least one of a histogram, a bar chart, a line chart, a heat map, an indication of a quantity of entries in a respective subset or portion thereof, and discrete representations of the entries of the respective subset.

14. A computer readable memory storing processor-readable instructions for causing a computing device to perform operations, the operations, comprising:
    receiving, by a processor, an indication that a first facet was selected from a plurality of facets associated with a multi-faceted dataset, wherein the multi-faceted dataset includes a plurality of entries each associated with at least one linear attribute, wherein the entries are also associable to facets of the plurality of facets, and wherein the facets have multiple facet attributes associated therewith;
    in response to receipt of the indication, determining entries of a first subset such that the first subset includes the entries of the dataset that are associated with a first facet attribute, wherein the first facet attribute is associated with the first facet;

in response to receipt of the indication, determining entries of a second subset such that the second subset includes the entries of the dataset that are associated with a second facet attribute, wherein the second facet attribute is associated with the first facet; and rendering, with the display component, a visual representation of the first subset and a visual representation of the second subset, wherein the visual representation of the first subset depicts the entries of the first subset in positions that are individually based on the at least one linear attribute associated with that entry relative to a common reference, and wherein the visual representation of the second subset depicts the entries of the second subset in positions that are individually based on the at least one linear attribute associated with that entry relative to the common reference.

15. The computer readable memory of claim 14, wherein the operations further comprise:

receiving, by the processor, an indication that a second facet was selected from the plurality of facets;

determining the entries of combination subsets for each combination of the first facet attribute with facet attributes associated with the second facet, wherein each combination subset includes the entries of the dataset that are associated with both of the facet attributes of that combination; and rendering, with the display component, visual representations of each of the combination subsets.

16. The computer readable memory of claim 15, wherein the operations further include comprise:

rendering, with the display component, a hierarchical depiction of the first and second facets and of the facet attributes associated with the first and second facets; and wherein rendering the visual representations includes:

rendering, with the display component, the visual representations of each of the combination subsets in alignment with portions of the hierarchal depiction corresponding to both of the facet attributes of that combination subset.

17. The computer readable memory of claim 16, wherein the operations further comprise:

receiving, by the processor, an indication that an operation is to be performed on the hierarchical depiction, wherein the operation is a reordering or a resizing of any of the first facet, the facet attributes associated with the first facet, the second facet, and the facet attributes associated with the second facet;

performing the indicated operation on the hierarchical depiction; and modifying the visual representations of the combination subsets such that the visual representations remain aligned to the respective portions of the hierarchal depiction that correspond to both of the facet attributes of that combination subset.

18. The computer readable memory of claim 14, wherein the at least one linear attributes are temporal attributes, geographical attributes, sequence numbers, or prices.

19. A system for rendering representations of dataset entries, comprising:

a computing device having a memory, a processor coupled to the memory, and a display component coupled to the processor, wherein the computing device is configured to:

open a multi-faceted temporal dataset that includes a plurality of entries having at least one temporal attribute, wherein the entries are associable to a plurality of facets, and wherein each of the facets has multiple facet attributes associated therewith;

render selectable icons of the facets of the plurality of facets;

receive indications that at least two facets were selected from the plurality of facets and an indication of a relationship between a first facet attribute of a first facet from the at least two facets and a second facet from the at least two facets;

render a hierarchical depiction of the selected facets and of the facet attributes associated with the selected facets;

determine a set of facet attribute combinations, wherein the set of facet attribute combinations includes one facet attribute combination for each facet attribute of the second facet, and wherein the facet attributes of each facet attribute combination include the first facet attribute and the facet attribute of the second facet corresponding to that facet attribute combination;

for each determined facet attribute combination, determine the entries of a subset that includes the entries of the dataset that are associated with all of the facet attributes of that facet attribute combination; and for each subset, render a visual representation of the entries of the subset, wherein the visual representation is:

aligned, in a first dimension, to a portion of the hierarchal depiction that corresponds to all of the facet attributes of that subset;

wherein the entries of each subset are depicted in the respective visual representations at positions of a second dimension determined based on the temporal attribute of that entry relative to a shared reference.

20. The system of claim 19, wherein the computing device is further configured to:

render a graphical user interface, wherein the graphical user interface includes:

a facet selection area configured to display the selectable icons of the facets and to enable selection of the facets;

a hierarchical display area configured to display the hierarchical depiction and to enable operations to be performed upon the hierarchical depiction, wherein the enabled operations include:

a reordering of representations of the selected facets, a reordering of representations of the facet attributes associated with the selected facets, a resizing of representations of the facet attributes associated with the selected facets, a linking of another facet attribute of the first facet to the second facet; and a grouping of representations of the facet attributes associated with the selected facets; and a dataset display area configured to display the visual representations of the subsets.

* * * * *